Sept. 8, 1964  L. AXTHAMMER ETAL  3,147,966
HYDROPNEUMATIC VEHICULAR SUSPENSION UNIT
Filed Dec. 20, 1963  3 Sheets-Sheet 1

INVENTORS
Ludwig Axthammer, Felix
Wössner
By Richard Ernst
Ag't

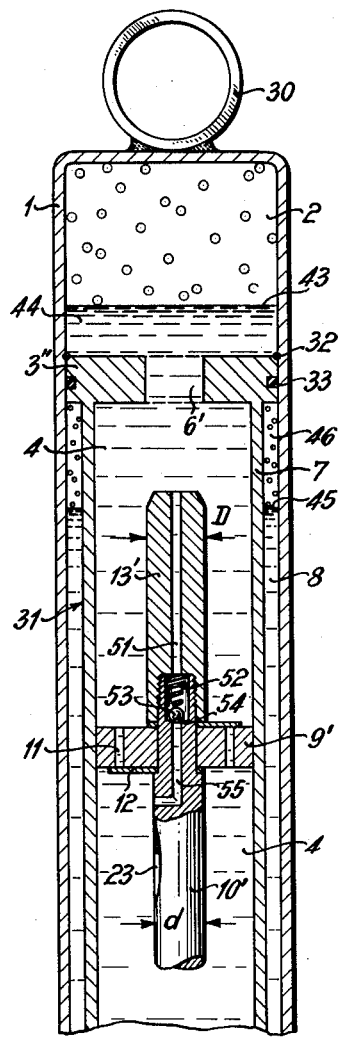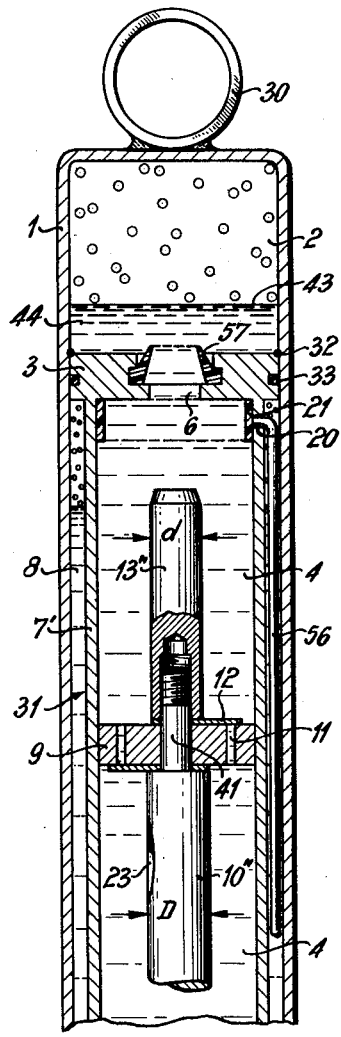

United States Patent Office 3,147,966
Patented Sept. 8, 1964

3,147,966
HYDROPNEUMATIC VEHICULAR
SUSPENSION UNIT
Ludwig Axthammer and Felix Wössner, both of Schweinfurt (Main), Germany, assignors to Fichtel & Sachs A.G., Schweinfurt (Main), Germany, a corporation of Germany
Filed Dec. 20, 1963, Ser. No. 332,213
Claims priority, application Germany Dec. 24, 1962
19 Claims. (Cl. 267—64)

This invention relates to suspension units for connecting the sprung and unsprung masses of a vehicle, and more particularly to self-levelling hydropneumatic or so-called "air-oil" suspension units.

Hydropneumatic suspension units rely for their automatic levelling action on a reciprocating pump which provides additional liquid for the spring section of the unit when the latter is compressed by static or dynamic loading beyond a predetermined extent. The pump and its associated element add to the bulk, the complexity, and the cost of the unit.

It is a disadvantage of many conventional pumps that they produce pressure peaks in the pumped liquid at the onset of pumping operation. The pump draws the additional liquid from a storage space through a check valve which is closed during the pressure stroke of the pump. A pressure peak at the onset of that stroke tends to slam the check valve closed, and shortens the useful life of the valve.

The primary object of the invention is the provision of a suspension unit in which the functions of the levelling pump are largely assumed by elements of the unit inherently required for performing the spring and shock absorbing action thereof, and thereby to provide a unit of simple construction, having a minimum of bulk of weight, and inexpensive to build, to operate, and to maintain.

Another object is the provision of a suspension unit in which harmful pressure peaks during the power stroke of the pumping section are avoided.

A suspension unit of the "air-oil" type necessarily includes a cylinder member and a plunger or piston member which are respectively attached to the sprung and unsprung masses of the vehicle. We have found that the plunger member itself may assume the functions of a pump piston when the plunger member has axial portions of different cross sectional area which move into and out of a pump space in the cylinder member during the normal relative oscillations of the sprung and unsprung masses, and thereby alternatingly produce suction and pressure in the pump space. The pump space may be connected by suitable valves to the spring section of the unit and to a storage space for additional liquid to pump the liquid to the spring section as needed.

These features of the invention are embodied in a unit in which a cylinder member encloses a cavity and suitable first wall means define a storage space. Second wall means divide the cylinder member cavity into a pump space and a pressure space. The second wall means is formed with an opening which passes therethrough in a predetermined direction. A differential plunger member is arranged for movement inward and outward of the pump space between two terminal positions. A first plunger portion sealingly engages the cylinder member during that movement. A second plunger portion whose cross sectional area is different from that of the first portion sealingly engages the opening in the aforementioned second wall means when the plunger member is in or near one terminal position, and is spaced from the second wall means to leave the opening free when the plunger member is in or near its other terminal position.

One check valve connects the storage space to the pump space to admit stored liquid to the pump space when suction prevails in the latter space. A second check valve connects the pump space to the pressure space to admit the pumped liquid to the pressure space during the pressure period in the pump space. A third valve establishes communication between the pump space and the storage space when the plunger member moves near the aforementioned other terminal position.

The cylinder and plunger members are connected to the sprung and unsprung masses of a vehicle or to corresponding objects in a conventional manner.

Other features and many of the attendant advantages of this invention will be readily appreciated as the same becomes better understood by reference to the following detailed description when considered in connection with the accompanying drawings wherein:

FIG. 4 illustrates another modified unit in a view corresponding to that of FIG. 3; and FIG. 5 is an axially sectional fragmentary view of yet another modification of the unit of FIGS. 1 and 2.

Figure 1:
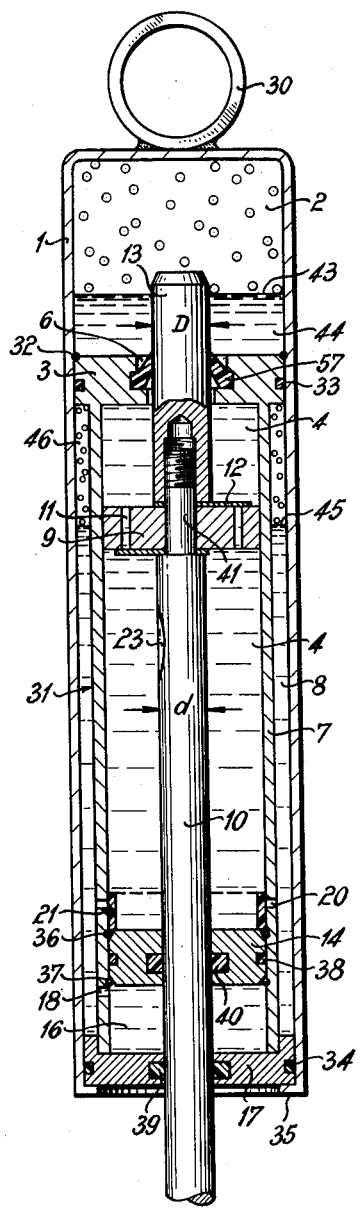
FIG. 1 shows a suspension unit of the invention in axial section.

Referring now to the drawing in detail, and initially to FIG. 1, there is shown a suspension unit of conventional external appearance. A cylindrical tubular shell 1 is integrally closed at one axial end. An inwardly projecting flange 35 at the open end of the shell 1 retains a plug 17. A cylindrical portion 10 of a plunger is axially slidable in the plug 17 inward and outward of the shell 1. Annular gaskets 34, 39 provide seals between the plug 17, the plunger portion 10 and the shell 1. A ring 30 welded to the integrally closed end of the shell 1 is provided for fastening the shell to the body of a vehicle, and a wheel may be attached to the part of the plunger portion 10 which projects from the shell 1.

An inserted wall unit 31 separates a narrow annular storage space 8 from the operating cavity in the shell 1. The unit consists of a generally cylindrical disk 3 coaxial with the shell 1 and of a coaxial elongated sleeve 7 integral with the disk 3, and spaced from the shell 1 by the radial width of the storage space 8. The free axial end of the sleeve 7 is received in a central cylindrical recess of the plug 17. A fluidtight seal between the disk 3 and the shell 1 is provided by a gasket ring 33. A spring clip 32 prevents movement of the wall unit 31 away from the flange 35.

Another plug 14 is axially secured within the sleeve 7 by spring clips 36, 37 and separates a chamber 16 from a pump space 4 which extends axially from the plug 14 to the disk 3. The plunger portion 10 passes axially through the center of the plug 14. Fluidtight seals between the plug 14, the plunger portion 10, and the sleeve 7 are formed by annular gaskets 38 and 40. The chamber 16 is connected to the storage space 8 by permanently open narrow radial bores 18 in the sleeve 7 of which only one is shown in the drawing for the sake of clarity.

Another set of radial bores 20 in the sleeve 7 adjacently above the plug 14 is normally covered by a short tubular membrane 21 of yieldably resilient material which is held against the inner surface of the sleeve 7 under its resilient tension.

A stud 41 is coaxially and permanently attached to the radial end face of the plunger portion 10 in the shell 1. The free end portion of the stud 41 is threaded, and threadedly received in an axial bore of another cylindrical plunger portion 13 whose diameter D is greater than the diameter d of the portion 10. The coaxial plunger portions 10, 13 thus jointly constitute a differential plunger.

The stud 41 passes axially through a central opening in a damping piston 9. Two valve flaps 12 are respectively partly interposed between the piston 9 and the plunger portions 10, 13 and are clamped tight against opposite surfaces of the piston by the threaded engagement between the stud 41 and the portions 13. The flaps normally close respective narrow damping passages 11 in the piston 9. They are of resilient material so that either one or the other passage 11 is opened by the respective flap when a pressure differential develops between the two compartments which are separated by the piston 9 in the pump space 4.

Figure 2:
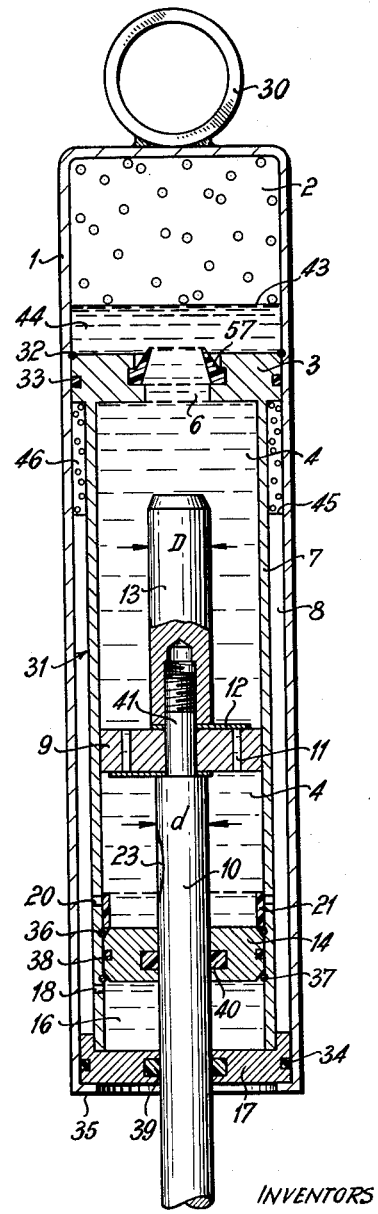
FIG. 2 shows a suspension unit of FIG. 1 in a different position.

The disk 3 has a central axial opening 6 which connects the pump space 4 with a pressure space 2 when the differential plunger is in the position shown in FIG. 2. A resilient annular packing 57 of approximately frustoconical shape is retained in the opening 6 by conforming engagement with a recess in the wall of the opening. The opening of the packing 57 at the narrow end thereof adjacent the pressure space 2 is smaller when in the relaxed condition than the cross sectional area of the plunger portion 13. The flow section of the opening 3 is somewhat greater than that cross sectional area. The packing 57 thus provides a seal between the wall member 3 and the plunger portion 13 in the position of the latter illustrated in FIG. 1 unless a higher pressure in the pump space 4 than in the pressure space 2 opens a gap between the packing 57 and the wall member 3 in the opening 6.

A liquid 44 completely fills the two compartments of the pump space 4 above and below the piston 9, a portion of the pressure space 2 above the wall member 3 to a level 43, and a portion of the storage space 8 to a level 45. Air under pressure fills the pressure space 2 above the level 43, and an air cushion 46 under a pressure which is normally higher than atmospheric pressure occupies the storage space 8 above the level 45.

The fixedly attached piston 9 limits axial movement of the differential plunger 10, 13 in the working cavity of the shell 2 to terminal positions in which the piston respectively abuts against the disk 3 and the membrane 20. In the lower terminal position of the plunger, an axially elongated groove 23 in the surface of the plunger portion 13 is aligned with the plug 14 and forms a by-pass conduit around the gasket 40.

The afore-described apparatus normally assumes the position shown in FIG. 2 in which the plunger portion 13 is withdrawn downward from the opening 6, and free communication is established between the pump space 4 and the pressure space 2. When the suspension unit is compressed under an increased load applied to the ring 30 and to the outward projecting part of the plunger portion 10, liquid 44 corresponding to the additional volume of the plunger portion 10 entering the pump space 4 is displaced from the latter through the opening 6 into the pressure space 2 against the resilient force of the compressed gas therein. The inward movement of the plunger is also resisted by the frictional drag of the liquid 44 which flows downward through the opened damping passages 11 and prevents oscillation of the sprung and unsprung masses. When the load on the unit decreases, the pressure of the gas in the pressure space 2 displaces liquid 44 through the opening 6 into the pump space 4, and the plunger 10, 13 is driven outward of the shell 1. This movement also is opposed by the frictional drag of the liquid in the passages 11.

When the load applied to the suspension unit is very high, the plunger portion 13 is driven through the opening 6 into the pressure space 2 as shown in FIG. 1, and the packing 57 seals the pressure space 2 from the pump space 4 as long as a higher pressure in the latter cannot overcome the resilient force of the gasket which is backed by the pressure in the space 2.

When the plunger 10, 13 moves inward of the shell 1, an axial section of the wider plunger portion 13 leaves the pump space 4 while an equally long axial section of the narrower plunger portion 10 enters the pump space. The total volume occupied by the plunger in the pump space is thereby reduced, and a vacuum would form in the pump space if the membrane 21 would not yield to admit additional liquid from the storage space 8 under the pressure of the air cushion 46.

During an outward movement of the plunger from the position shown in FIG. 1, the wider plunger portion 13 enters the pump space 4, and the narrower portion 10 is withdrawn. Positive pressure is built up in the pump space. The membrane 21 is forced against the inner wall 7 by the liquid pressure in the pump space, and the connection between the pump space and the storage space 8 is blocked. The increasing pressure in the pump space opens a gap between the packing 57 and the plunger portion 13, and liquid flows into the pressure space, further compressing the air cushion therein.

The volume of liquid 44 in the pressure space 2 is increased during alternating inward and outward movements of the plunger 10, 13 until the plunger portion 13 is expelled from the pressure space 2 and the normal operating condition shown in FIG. 2 is restored.

Conversely, when the load on the unit is very substantially reduced while the unit is in the condition illustrated in FIG. 2, the differential plunger 10, 13 is driven outward of the shell 1 until the groove 23 by-passes the gasket 40. The liquid 44 then may escape from the lower compartment of the pumping space 4 through the groove 23 into the chamber 16, and return from there through the bores 18 into the storage space 8, thereby compressing the air cushion 46 to its normal superatmospheric pressure. The unit thus tends automatically to seek a level of operation which corresponds to the position shown in FIG. 2.

Regardless of the position of the plunger 10, 13, oscillations of the unit are effecively damped by the piston 9. The piston is effective not only during inward movement of the plunger 10, 13, but also during the outward movement which increases the effective length of the unit. This characteristic of the suspension unit of the invention permits the same to be employed successfully in parallel arrangement with conventional helical, torsional, or leaf springs in the manner of conventional shock absorbers and to replace such shock absorbers in conventional suspension systems, whereby the suspension system acquires the characteristics of an air-oil suspension.

The piston 9 contributes materially to the pumping efficiency of the suspension unit when it is in the position shown in FIG. 1. The pressure between the two compartments of the pump space 4 may differ appreciably because of the restricted flow section of the passages 11. During the inward movement of the plunger 10, 13, which is generally associated with the suction stroke of the pumping arrangement, the pressure in the upper compartment may initially rise sufficiently due to slow drainage through the passages 11 to force a portion of the liquid 44 from the upper compartment through packing 57 into the pressure space 2. The suction produced in the lower compartment of the pump space is built up accordingly faster. The total amount of liquid drawn into the pump space during the suction stroke may thus be greater than the difference in volume between the two sections of the plunger portions 10, 13 which replace each other during that stroke.

During the outward movement of the plunger 10, 13 the pressure initially rises slowly in the upper compartment of the pump space, and more slowly than in the lower one because liquid cannot flow fast enough through the passages 11 if the outward movement sets in very rapidly. The resulting gradual opening of the packing 57 not only gives a controlled ride of pleasant characteristics to the vehicle equipped with the suspension unit of the invention, but greatly contributes to the useful life of the valve formed by the packing 57. The retarded closing of the packing during the suction stroke is equally effective both with respect to the characteristics of the unit and to the long useful life of the unit without need for repairs or maintenance.

The large central opening 6 favors separation by gravity during operation of the device if air (or any other gas employed as the pneumatic member of the hydropneumatic unit) should be admixed with the liquid 44 which usually is oil or automotive hydraulic fluid. Gas mixed with the liquid in the storage compartment 8 similarly tends to separate from the liquid. Because the storage space 8 is sealed, small bubbles of air carried by flowing liquid into the storage space do not abruptly expand. Such expansion would produce foaming in the storage space, and would interfere with effective pumping operation. The pressure in the gas cushion 46 should be normally higher than that of the atmosphere, but it should always be substantially lower than that of the pressure space 2. If this pressure differential does not exist, the movements of the piston 9 produce a pumping effect.

The hydropneumatic suspension unit of the invention is quickly assembled from few component parts which themselves are quite simple. The wall unit 31 is first slipped into position before the flange 35 is formed. The plunger portions 10, 13 are assembled with the piston 9 and the valve flaps 12, and the plunger assembly is inserted in the sleeve 7. The membrane 21, and the plugs 14 and 17 are put in position in that order, and the rim of the shell 1 is bent over to form the flange 35. The unit may be filled with liquid and gas during the assembly or after completion. Conventional filling nipples may be provided in the shell 1 for that purpose, but have not been illustrated.

If the gas and liquid are mixed during the charging of the unit, they separate by gravity as soon as the unit is operated. The narrow and rapid streams of liquid which emerge from the passages 11 during downward movement of the damping piston 9 are partly deflected from an axially upward direction by the flaps 12. The portion of the expelled liquid which still moves axially upward after passing the flaps 12 impinges on the imperforate portion of the disk 3. The movements of the piston 9 thus cause very little turbulence, if any, in the pressure space 2, and do not contribute to dispersion of gas in the liquid 44 at the interface 43.

Figure 3:
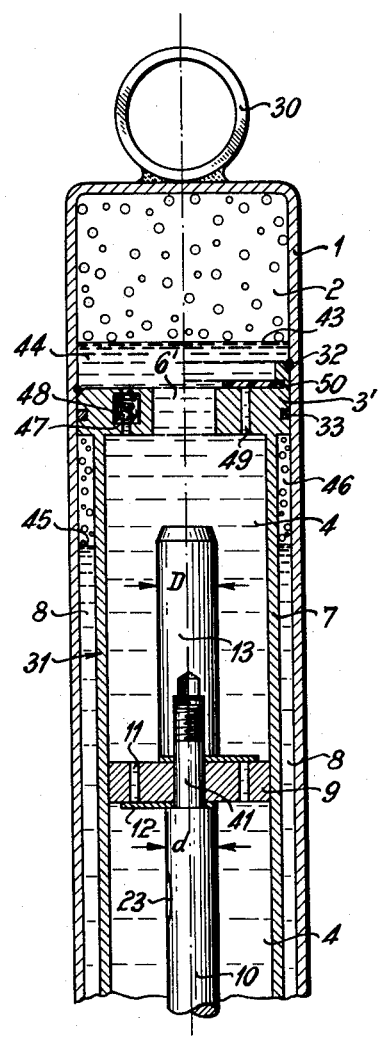
FIG. 3 shows a modified unit of the invention in a fragmentary view corresponding to that of FIG. 2.

The modified embodiments of the invention illustrated in FIGS. 2 and 3 are equipped with different pressure responsive check valves for connecting the pump space 4 with the pressure space 2, but are otherwise closely similar to the aforedescribed suspension unit.

The check valves illustrated in FIG. 3 replace the packing 57. The opening 6' in the disk 3' is dimensioned for movable sealing fit with the plunger portion 13. An axial bore 47 in the disk 3' is normally closed by a spring-biased spherical valve member 48. The bore 47 is opened when the pressure in the pump space 4 exceeds that in the pressure space 2 sufficiently to overcome the restraining force of the valve spring.

Another axial bore 49 in the disk 3' is covered by a resilient valve flap 50 mounted in the pressure space 2, and functions in the same manner as the ball valve 48. It will be appreciated that the two valves in the disk 3' are interchangeably usable, and that a unit of the invention may be equipped with several valves of one kind only.

The disk 3" shown in FIG. 4 cooperates with a modified plunger assembly of two axial plunger portions 10', 13' fixedly holding a damping piston 9', in a similar manner to that shown in FIGS. 1 and 2. An axial bore 51 passes through the plunger portion 13' from the free end face thereof to a valve chamber formed between the other end of the portion 13' and the plunger portion 10'. The latter forms a valve seat 54 in the chamber, and a duct 55 leads from the seat 54 to the lower compartment of the pump space 4. A spring 52 normally urges a spherical valve member 53 against the seat 54 and blocks the duct 55. When the unit shown in FIG. 4 is in the pumping position, the valve member 53 connects and disconnects the spaces 2 and 4 in a manner analogous to the operation of the packing 57.

In the modified suspension unit shown in FIG. 5, the dimensional relationship of the plunger portions is inverted. The portion 10" which extends outward of the shell 1 has a larger diameter $D$ than the diameter $d$ of the other plunger portion 10". The outward stroke of the differential plunger thus is the suction stroke of the pumping arrangement, and the inward stroke is the power stroke during which additional liquid is forced into the pressure space 2 from the pumping space 4.

The afore-described benefits derived from the axial movement of the damping piston 9 during pumping operation are ensured by connecting the storage space 8 not with the lower, but with the upper compartment of the pumping space. The radial bores 20 and the associated membrane 21 are located closely adjacent the disk 3. A tube 56 leads from the bore 20 downward to a portion of the space 8 which is below the liquid level under all operative conditions of the suspension unit. The apparatus shown in FIG. 5 thus operates in the same manner as described hereinabove with specific reference to FIGS. 1 and 2.

It should be understood, of course, that the foregoing disclosure relates to only a preferred embodiment of the invention, and that it is intended to cover all changes and modifications of the examples of the invention herein chosen for the purpose of the disclosure which do not constitute departures from the spirit and scope of the invention set forth in the appended claims.

What is claimed is:

1. A suspension unit for connecting a sprung mass to an unsprung mass comprising, in combination:
   (a) a cylinder member enclosing a cavity therein;
   (b) first wall means defining a storage space;
   (c) a second wall means dividing said cavity into a pump space and a pressure space,
      (1) said second wall means being formed with an opening therethrough, said opening passing through said second wall means in a predetermined direction;
   (d) a differential plunger member arranged for movement in said direction inward and outward of said pump space between two terminal positions,
      (1) said plunger member having a first portion of substantially uniform cross section sealingly engaging said cylinder member during said movement, and
      (2) a second portion of substantially uniform cross section different in area from the cross section of said first portion,
      (3) said second portion being adapted sealingly to engage said opening when said plunger member is adjacent one of said terminal positions thereof, and
      (4) said second portion being spaced from said second wall means when said plunger member is adjacent the other terminal position thereof;
   (e) first pressure responsive valve means selectively connecting said storage space to said pump space for admitting liquid from said storage space to said pump space when the pressure in the latter is lower than in the former;

(f) second pressure responsive valve means selectively connecting said pump space to said pressure space for admitting liquid from the pump space to the pressure space when the pressure in the latter is lower than in the former;

(g) third valve means responsive to movement of said plunger member into a position adjacent said other terminal position for connecting said storage space to said pump space;

(h) fastening means for respectively fastening said cylinder member and said plunger member to a sprung mass and to an unsprung mass.

2. A unit as set forth in claim 1, wherein said second valve means is mounted on said second wall means for selectively opening and closing an opening passing through said second wall means.

3. A unit as set forth in claim 1, wherein said second valve means includes resilient sleeve means mounted in said opening for sealingly engaging said second plunger member portion when the pressure in said pressure space is higher than in said pump space, and opening a gap between said second plunger member portion and said second wall means when the pressure in said pump space is higher than in said pressure space.

4. A unit as set forth in claim 1, wherein said plunger member is formed with a bore communicating with said pump space and with said pressure space, and said second valve means is arranged to open and close said bore.

5. A unit as set forth in claim 1, further comprising a damping member dividing said pump space into two compartments spaced in said direction, said damping member sealingly engaging said plunger member, said damping member being formed with a damping passage of a flow section substantially smaller than the flow sections of said compartments, and connecting said compartments.

6. A unit as set forth in claim 5, wherein said damping member is mounted on said plunger member for movement therewith.

7. A unit as set forth in claim 6, wherein said damping member is interposed between said first and said second portion of said plunger member, whereby said first and second portions are respectively located in said compartments.

8. A unit as set forth in claim 7, wherein said first valve means directly communicates with the compartment of said pump space wherein the plunger member portion of smaller cross sectional area is located.

9. A unit as set forth in claim 6, wherein said damping member is formed with an additional damping passage of said smaller flow section and connecting said compartments, and check valve means for respectively blocking said damping passages responsive to a higher liquid pressure in one compartment than in the other compartment.

10. A unit as set forth in claim 1, wherein said first wall means include a sleeve member in said cylinder member, said sleeve member separating said storage space from said pump space.

11. A unit as set forth in claim 10, wherein said sleeve member is formed with a bore therethrough, and said first valve means include a resilient member normally closing said bore, and responsive to higher pressure in said storage space to open the bore.

12. A unit as set forth in claim 1, wherein said third valve means include third wall means transverse of said direction and separating said cavity from a chamber in said cylinder member, said plunger member passing through an opening in said third wall means in movable, normally sealing engagement, and being formed with a conduit therein having respective open portions spaced in said direction a distance greater than the thickness of said third wall means in said direction for selectively connecting said chamber to said pump space when said plunger member moves into said position adjacent said other terminal portion thereof, said chamber communicating with said storage space.

13. A unit as set forth in claim 1, further comprising a liquid substantially filling said pump space, and filling respective portions of said storage space and of said pressure space; and pneumatic pressure means for exerting pressure on the portion of said liquid in said pressure space.

14. A unit as set forth in claim 13, further comprising pneumatic pressure means in said storage space for exerting pressure on the portion of said liquid in said storage space.

15. A suspension unit for connecting a sprung mass to an unsprung mass comprising, in combination:
(a) a cylindrical shell having an axis, one axial end of said shell being closed;
(b) a unitary wall member in said shell, said wall member including
(1) a disk portion extending transversely of said axis and defining a pressure space in said shell adjacent said closed axial end, and
(2) a tubular sleeve portion coaxial with said shell and spaced therefrom to separate an annular storage space adjacent said shell from a pump space within said sleeve portion,
(3) said disk portion being formed with a central opening therethrough, the opening connecting said pressure space and said pump space,
(4) said sleeve portion extending from said disk portion toward the other axial end of said shell;
(c) plug means axially closing said storage space and said pump space adjacent said other end of said shell;
(d) a differential plunger member axially movable inward and outward of said shell between two terminal positions respectively adjacent and remote from said one closed end,
(1) said plunger member having a first axial portion of substantially uniform cross section in movable, conforming, sealing engagement with said plug means, and
(2) a second portion of substantially uniform cross section different in area from the cross section of said first portion,
(3) said second portion being adapted sealingly to engage said opening when said plunger member is in the terminal position thereof adjacent said one closed end, and
(4) said second portion being spaced from said disk portion in the terminal position thereof remote from said one closed end;
(e) first valve means for selectively admitting liquid from said storage space to said pump space responsive to higher liquid pressure in said storage space;
(f) second valve means for selectively admitting liquid from said pump space to said pressure space responsive to higher liquid pressure in said pump space;
(g) third valve means for selectively connecting said pump space to said storage space responsive to said remote terminal position of said plunger member, and a damping piston mounted on said plunger member for axial movement therewith in said pump space, said damping piston being formed with a damping passage therethrough and sealingly engaging said sleeve portion.

16. A unit as set forth in claim 15, wherein said plug means include a first plug member in said sleeve portion, and a second plug member in said other axial end of said shell, axially spaced from said first plug member, said first plug member separating said pump space from a chamber in said sleeve portion, and said second plug member axially closing said chamber and said storage space, said plunger member axially passing through said first and second plug members and outward of said shell.

17. A unit as set forth in claim 16, further comprising integral fastening means on said other axial end portion of said shell axially securing said second plug member.

18. A unit as set forth in claim 16, wherein said sleeve portion is formed with a radial bore, and said first valve means is arranged selectively to open and close said bore responsive to the pressures in said pump space and in said storage space.

19. A unit as set forth in claim 16, wherein said plunger member has a bore therethrough, said bore communicating with said pressure space and with said pump space when said plunger member is in the terminal position thereof adjacent said one closed axial end, said second valve means being arranged selectively to open and close said bore responsive to the pressures in said pump space and in said pressure space.

No references cited.